Sheet 1, 2 Sheets.

D. McCullough.
Walking Corn Planter.

No. 92,984. Patented Jul. 27, 1869

Witnesses:
C. H. Pettit
S. C. Kenron

Inventor:
D. McCullough
by Munn & Co.
Attorneys.

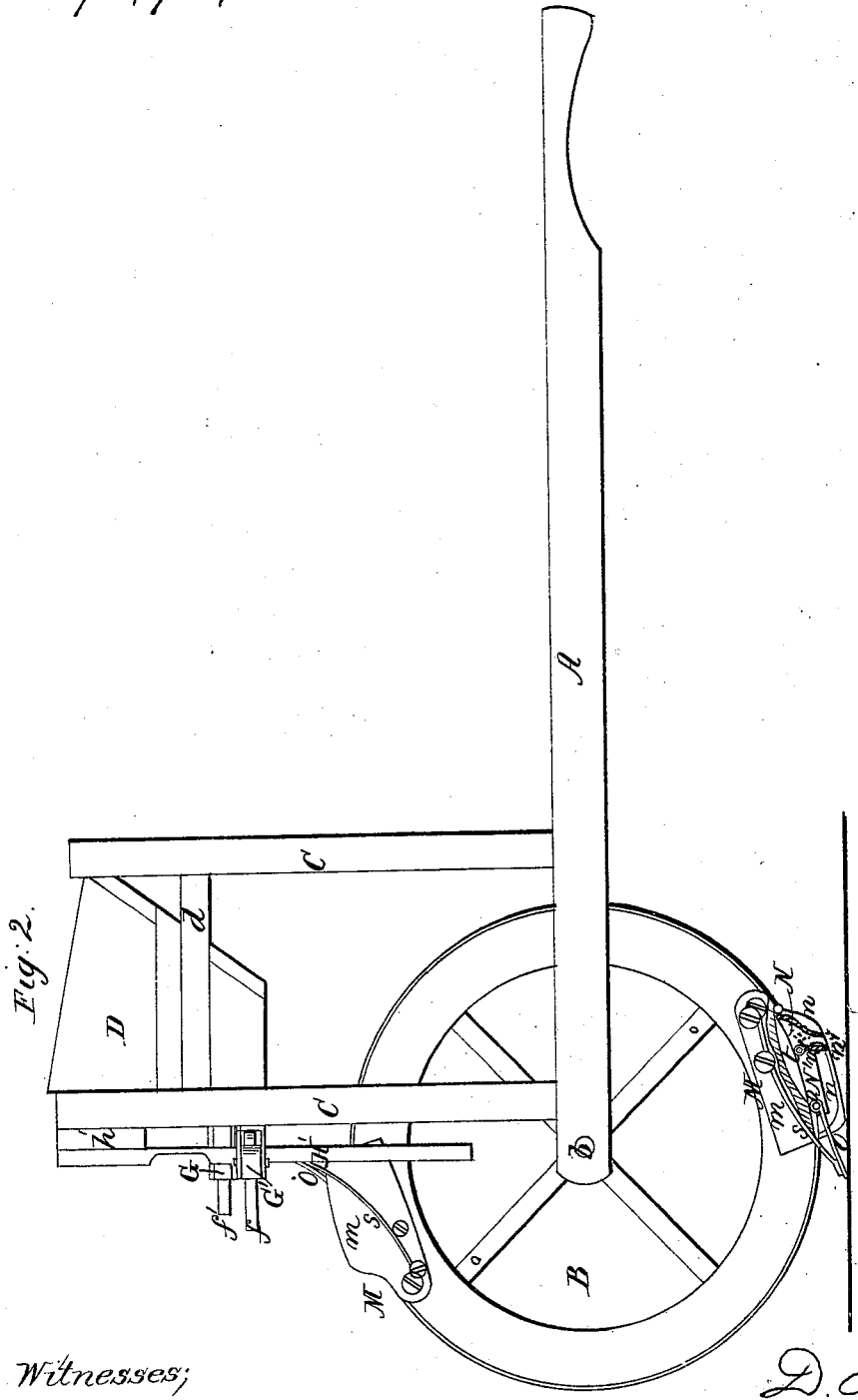

United States Patent Office.

DANIEL McCULLOUGH, OF OXFORD TOWNSHIP, ONTARIO, CANADA, ASSIGNOR TO HIMSELF, WILLIAM J. SCOTT, JR., AND PATRICK HARTY.

Letters Patent No. 92,984, dated July 27, 1869.

IMPROVEMENT IN CORN-PLANTERS.

The Schedule referred to in these Letters Patent and making part of the same.

*To all whom it may concern:*

Be it known that I, DANIEL McCULLOUGH, of the township of Oxford, in the county of Greenville, Province of Ontario, and Dominion of Canada, have invented a new and improved Corn-Planter; and I do hereby declare that the following is a full, clear, and exact description of the construction and operation of the same, reference being had to the accompanying drawings, making a part of this specification, in which—

Figure 3 is a longitudinal vertical section.

Figure 2:
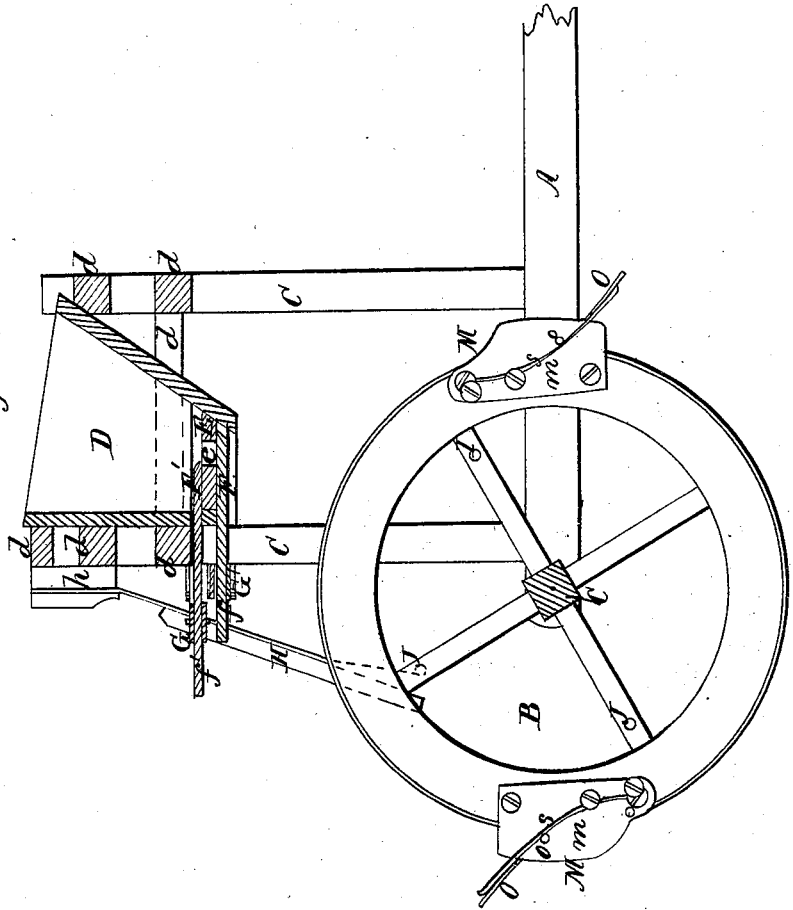
Figure 2 is a side view.
Figure 1:
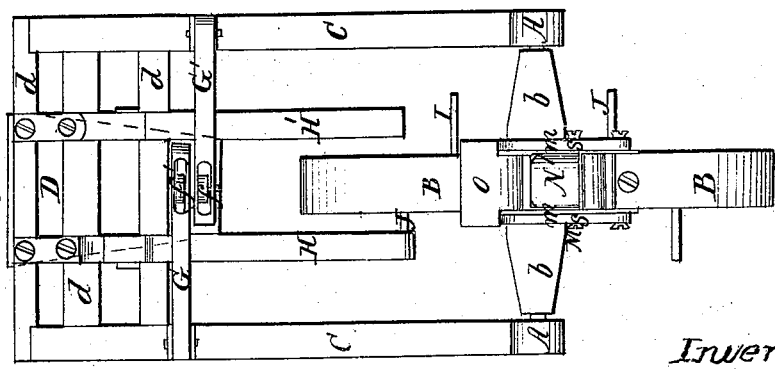
Figure 1 is a front view.

This invention consists in the construction of a wheeled vehicle having a seed-hopper which distributes the seed at intervals into boxes on the circumference of one or more wheels, by the revolution of which, in the progress of the machine over the ground, the seed is planted in hills at regular intervals.

In the drawings—

A A represent the handles and lifting-bars of the machine, they being connected by cross-bars or rounds, and supported at their forward end upon the axle $b$, of a wheel B, like the handles of a common wheelbarrow.

C C are four vertical standards framed into the parts A A, directly behind axle $b$, for the purpose of supporting the hopper and its connected apparatus.

D is the hopper, supported by cross-bars $d\ d$, connecting the four standards near their upper end.

E is the bottom of the hopper, having a seed-opening, $e$, at a suitable point.

F F' are slides, moving alternately back and forth, longitudinally with the machine, one above and the other beneath the hopper-bottom E, and so operating that the upper slide opens the hole $e$, and allows one or more seeds to drop down upon the lower slide, and then closes, immediately after which the lower slide opens and allows the seeds thus deposited upon it (and no more) to drop toward the ground.

G G are bars, pivoted at $g\ g'$ to the standards C C, and articulated at $i\ i$ to the shanks $f\ f'$, of the slides F F'.

H H' are spring-arms fastened upon blocks, $h\ h'$, fixed to the front side of the hopper, and extending vertically down through the bars G G, or in contact with them, so as to be connected to them by a link, chain, or other suitable means.

I J are pins so arranged upon wheel B, that, as the latter revolves by the forward movement of the machine, they will alternately strike the lower ends of the arms H H', and throw them forward, thus moving each slide forward in turn, and then will, in like order, disengage themselves from said arms, and allow the elastic force of the latter to spring the slides back to their original position again; and M M' are two or more seed-carriers and planters arranged upon the rim of wheel B, in such a manner that one of them is always in position under the aperture $e$ when the lower slide is opened, receiving the seed that drops therefrom, and then conveying it down, depositing it in the ground under the tread of the wheel, and covering it with earth.

The details of construction of the seed-conveyers and depositors M M, may be described as follows:

$m\ m$ are two plates fastened upon the sides of the wheel-rim opposite to each other by screws or rivets, and containing between them a seed-receptacle, N, the front wall, $n$, of which is immovable, the rear wall $n'$ being pivoted and shutting against the front wall like a door.

O is a plate or arm pivoted at $o\ o$, and projecting obliquely beyond the outer edges of the side-plates $m\ m$, so as to come in contact with the ground as the wheel turns.

$r$ is a pitman or connecting-rod extending from the front side of plate O to the rear side of the part $n'$, to each of which it is articulated, so that by bending the plate back on its pivot, the door $n$ is pulled open, and by moving the plate forward, the door is closed again.

$s$ is a spring, arranged in any suitable position, and operating to hold the plate O forward, and keep the door $n'$ closed, when they are not forced back by coming in contact with the ground, as above described.

It will be observed that the seed-conductor and depositor M is thus composed of an open box or receiver, N', into which the seed falls from the aperture $e$, and the closed box N, into which the seed slides after dropping into the open part N', the tread of the wheel being slightly channelled at that point, as seen at $t$, in order that the seed may pass under the edge of the door $n'$, and lodge in the closed box, as the wheel turns round.

It will also be observed that for the wheel B, axle $b$, and handles A A, the similar parts of any ordinary wheelbarrow may be used, only the parts M M, and the standard C C, and apparatus which they support, being requisite in addition thereto; or, on the other hand, if the entire machine is made new, the parts M M and the standards C C may be made removable, when the rest can be used conveniently as a wheelbarrow.

The rod $r$ and spring $s$ may be arranged either between or outside of the plates $m\ m$. When in the latter position, the journals or trunnions of the parts $n'$ O must extend through one of the plates $m$, and be made in the shape of a crank, so as to give the rod the proper purchase. The blocks $h\ h'$ are obviously not essential to the construction of the machine, and may be omitted whenever preferred by the manufacturer.

The operation of this machine is exceedingly convenient and effective. The seed is placed in hopper D, and the machine is moved over the ground like a wheelbarrow. As the large wheel, B, revolves, the parts M M excavate suitable beds to receive the seed. They also take the seed from the hopper, as it is discharged therefrom, in quantities suitable for each hill, and holding it in the closed box N, convey it down to the ground, where, at the moment that the part O strikes the ground and is thrown back, they discharge it into the seed-bed which they have formed for it, as above described. As the wheel continues to turn, and brings the plate O out of the ground again, the elasticity of the spring $s$ causes it to fly back with considerable force, and throw a covering of earth over the seed.

I do not, of course, limit myself to the employment of a single wheel, or hopper, nor to a hand-machine, but desire to be at liberty to apply my improvements to any form of machine, and to multiply the above-described parts, in a single machine, to any practicable extent.

Having thus described my invention,

What I claim as new, and desire to secure by Letters Patent, is—

1. In connection with the hopper-bottom E, having the seed-passage $e$, the alternately-reciprocating slides F F', arranged above and below the bottom E, and operated by means of the spring-arms H H', and pins I J, or their mechanical equivalent, all said parts being constructed to operate substantially as and for the purposes set forth.

2. The parts M M, when arranged upon the rim of a wheel, as and for the purposes described, said parts consisting essentially of the fixed plates $m\ m$, $n$, pivoted-plates O $n'$, rod $r$, and spring $s$, constructed to operate together, substantially in the manner specified.

3. The combination of the parts M M, constructed to operate as described, with the wheel B, pins I J, arms H H', levers or bars G G, slides F F', and hopper-bottom E, all operating together substantially as described and for the purposes specified.

To the above specification of my improvement, I have set my hand, this 12th day of June, 1869.

DANIEL McCULLOUGH.

Witnesses:
CHAS. A. PETTIT,
SOLON C. KEMON.